Feb. 19, 1924.
J. V. ROBINSON
1,484,081
TRAIN PIPE COUPLING
Original Filed Oct. 31, 1919   2 Sheets-Sheet 1
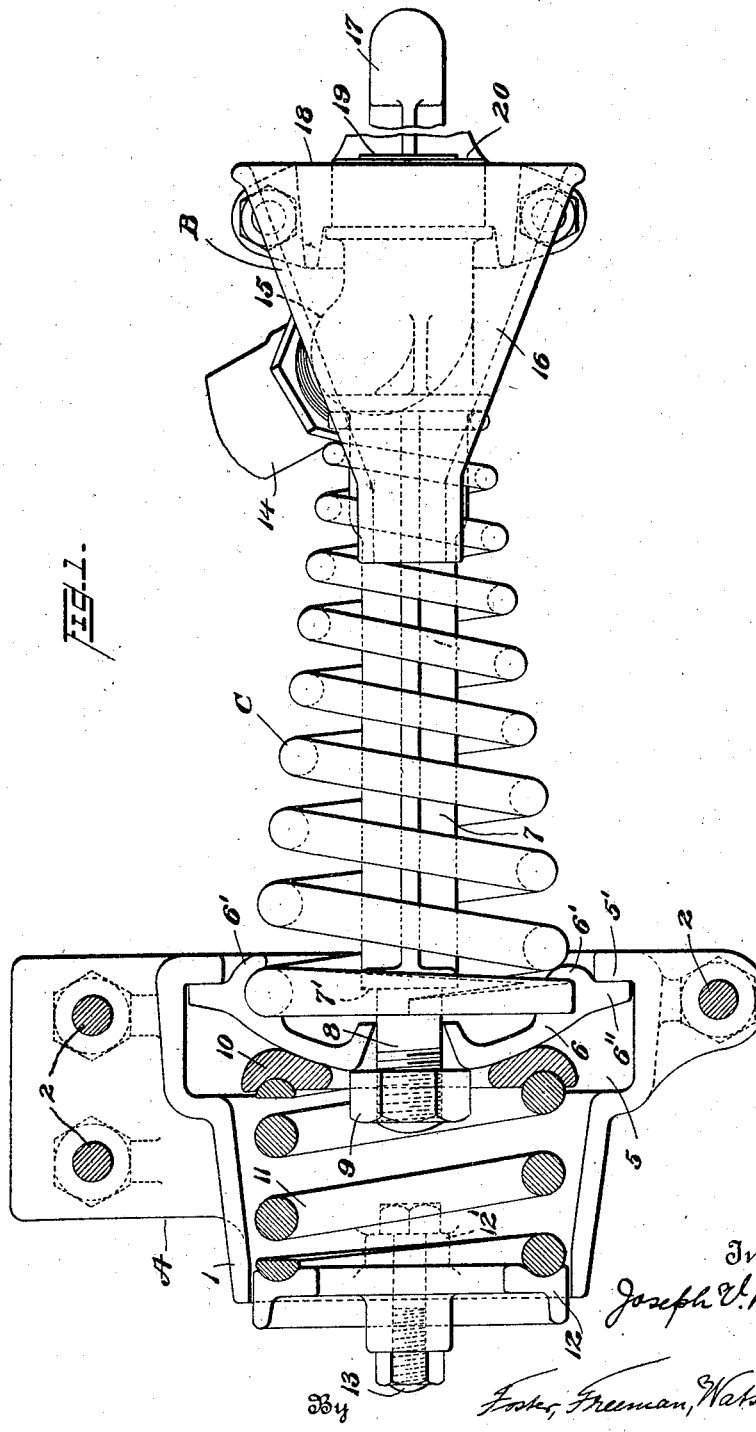

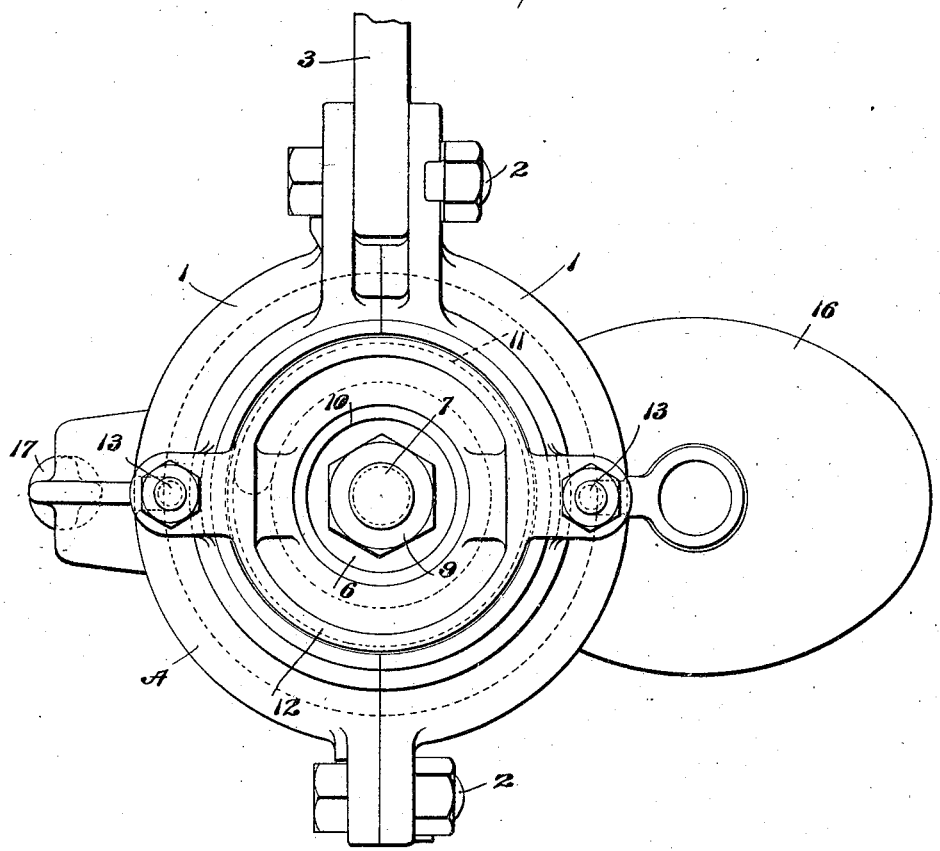

Patented Feb. 19, 1924.

1,484,081

UNITED STATES PATENT OFFICE.

JOSEPH V. ROBINSON, OF SANTA MONICA, CALIFORNIA.

TRAIN-PIPE COUPLING.

Application filed October 31, 1919, Serial No. 334,830. Renewed May 15, 1923.

*To all whom it may concern:*

Be it known that I, JOSEPH V. ROBINSON, a citizen of the United States, and residing at Santa Monica, Los Angeles County, State of California, have invented certain new and useful Improvements in Train-Pipe Couplings, of which the following is a specification.

The present invention relates to improvements in automatic means for coupling the pipes between railway cars and the object of the invention is to provide an improved means by which the head of each member of such a coupling will be supported so as to have a substantially universal movement, thus insuring that the coupling will remain in operative position regardless of the lateral or vertical movements of the cars in rounding curves, etc. Such a coupling comprises two similar members and in the accompanying drawings but one such member is illustrated.

In the drawings:

Figure 1 is a side view, partly in section, of a coupling constructed in accordance with my improvement; and Figure 2 is a rear elevation of the same.

Referring to the drawings, the improved coupling comprises a base A formed by two similar members 1 connected together by bolts 2, a conical supporting spring C formed of a tapered bar, the larger end of which spring is mounted in the base, and a two part head B with which the forward reduced end of said spring is connected. The upper bolts 2 in addition to connecting the members 1 of the base also are adapted to serve as the means for attaching the device to a suitable support 3 on the car frame.

The members 1 of the connector base are so formed that when assembled they provide an internal chamber 5 within which is positioned a two-part disk-like seat 6 in which the rear and larger end of the spring C is rigidly secured by the flanges 6' of the said seat. This spring seat is also provided with an annular flange 6" which bears against an inwardly extending flange or rim 5' at the forward end of the chamber 5, thus positively preventing undue movement of the spring seat in that direction. A rod 7, the forward end of which engages the head B, has a rearwardly projecting reduced section 8 that passes through and may slide in an aperture in the spring seat 6 and terminates in a threaded section on which is screwed a nut 9. The parts are so related that, by the rod 7, the head and spring seat are held at such a distance apart that the spring C is preferably continuously maintained under compression.

The rear face of the spring seat 6 is convex in form and fits in a complementary seat formed in a plate 10 that is supported at the forward end of a coiled buffer or auxiliary spring 11 arranged within a continuation 3 of the chamber 5 and held under compression by an abutment-like plate 12 which is secured to lugs 12' on the base members 1 by bolts 13. By tightening the nuts on these bolts 13, the spring 11 can be compressed to the desired extent to properly maintain the spring seat 6 normally pressed against the flange 5' at the forward end of the chamber 5.

The hose 14 leading from the train pipe of the car is detachably connected with a threaded fitting 15 on the rod 7, to the forward end of which the head B is clamped or otherwise secured, the head being shown as provided with a funnel-shaped guide 16 and a pin 17 adapted to enter the guide 16 of a corresponding coupling head, when effecting a coupling between the train pipes of two cars.

When two coupling members constructed as above described are brought together in the act of coupling the cars, heads B are guided into correct relation by the guides 16, 17, and are then pressed rearward compressing the supporting spring C. After the spring C is compressed slightly the shoulder 7' of the rod 7 engages the disk 6 and the disk is carried rearward away from its seat on the flange 5', the buffer spring 11 yielding. The parts are so proportioned that when adjacent cars are coupled the disk 6 will be substantially in a mid position in the casing in which it moves and capable of universal movement therein to a predetermined extent so that the coupling members as a whole will have sufficient freedom of movement in all the required directions, to avoid any strains which would tend to separate the faces of the coupling heads in passing around curves or under other extreme conditions of service. As soon as the cars are uncoupled the disk 6 will be thrust forward against the flange 5' and securely held in that position by the spring 11, and the coupling head will thereafter be thrust forward by the spring C so far as it is permitted to move by the nut 9. The spring C is sufficiently stiff and strong to hold the coupling head in a substantially horizontal extended position, as shown in Figure 1 of the drawing, but it is weaker than the spring 11. Thus it may be said that the spring 11 acts as a buffer spring to rigidly hold the disk 6 against the flange 5' throughout lateral or vertical movement of the head B in the act of coupling. This construction imposes upon the spring C the duty of accommodating the head B to the various lateral positions it must assume in the act of coupling, without moving the disk 6 from the flange 5'. The spring C being coiled of a tapered bar, each coil will yield its respective or proportionate extent thus effectively avoiding localization of stresses in the spring, and giving a resistance which increases in greater progression than the extent of movement of the head in both lateral and longitudinal directions. In a coupling constructed according to my improvement, the spring C operates normally to support the head B for lateral movements while the spring 11 operates to place the head under the pressure required to insure a tight joint between the coupling faces 18 of the heads B. The curved fitting or nipple 15 is of course hollow and serves to carry the fluid from the hose 14 to the coupling face 18, a suitable gasket 19 being contained in the forward end 20 of the fitting to seal the joint when the coupling heads B mate in coupling.

Having thus described my invention what is claimed as new and is desired to be secured by Letters Patent is,

1. In an automatic train pipe coupling, a coupling member comprising a base having a hollow chamber therein, a movable disk in the forward part of said chamber, a stationary inwardly extending seat for said disk at the forward end of said chamber, a spring in said chamber so mounted and connected thereto as to tend to force said disk to its seat, a coupling stem so connected to said disk as to permit slight relative movement and carrying a coupling head at its outer end, and a coiled spring around said stem between said disk and head normally holding said stem and coupling head extended in a fixed position, the connection being such as to permit the necessary lateral movement of said head and the outer end of the stem in coupling under the yielding action of said coil spring surrounding the stem while said disk remains in close contact with seat.

2. In an automatic train pipe coupling, a coupling member comprising a base having a hollow chamber therein, a movable disk in the forward part of said chamber, a stationary inwardly extending seat for said disk at the forward end of said chamber, a spring in said chamber so mounted and connected thereto as to tend to force said disk to its seat, a coupling stem so connected to said disk as to permit slight relative movement and carrying a coupling head at its outer end, and a coiled spring around said stem between said disk and head normally holding said stem and coupling head extended in a fixed position, the connection being such as to permit the necessary lateral movement of said head and the outer end of the stem in coupling under the yielding action of said coil spring surrounding the stem while said disk remains in close contact with its seat, the relative strength and tension of the springs being such that said disk will be out of contact with its seat and free to move within limits in any direction when coupled.

3. In an automatic train pipe coupling, a coupling member comprising a base having a hollow chamber therein, a movable disk in the forward part of said chamber, two spaced stationary inwardly extending seats for said disk in said chamber for limiting its forward and rearward movement, a spring in said chamber tending to hold said disk against its forward seat, a coupling stem connected to said disk carrying a coupling head at its outer end, and a coiled spring around said stem between said stem and head normally holding said stem and head in extended position, the relative strength and tension of the springs and the adjustment of the parts being such that said disk will occupy a position out of contact with both of its seats when the device is in operation coupled to a similar coupling of the next car, whereby the parts are free to move to the necessary extent in any direction to avoid undue strains in turning sharp curves.

4. In an automatic train pipe coupling, a coupling member comprising a base having a hollow chamber therein, a movable disk in the forward part of said chamber, a stationary inwardly extending seat for said disk at the forward end of said chamber, yielding means in said chamber for holding said disk to its seat, a stem so connected at one end to said disk at its central portion as to permit free but slight pivotal and longitudinal movement of said stem in reference to said disk, a coupling head carried by said stem at its outer end, and a coil spring under tension around said stem bearing at one end against said head and secured at its other end to said disk against separation.

5. In an automatic train pipe coupling, a coupling member comprising a base having a hollow chamber therein, a movable disk in the forward part of said chamber, a stationary inwardly extending seat for said disk at the forward end of said chamber, a coiled spring in said chamber forcing said disk to its seat and so connected thereto as to permit slight tilting without laterally displacing the spring, a coupling stem carrying a coupling head at its outer end so connected to said disk centrally as to permit slight relative movement, a tapering coiled spring around said stem secured at one end to said disk and bearing at its other end on said head to maintain the stem in extended position, the said tapered spring being so proportioned as to have insufficient strength during the first part of its compression to overcome the tension of the other spring and move said disk from its seat but when compressed to the extent necessary in coupling having sufficient strength to move said disk from its seat and in cooperation with the said first mentioned spring to hold it in suspended position in said chamber free to tilt or turn.

6. In an automatic train pipe coupling, a coupling member comprising a base having a hollow chamber therein, a movable disk in the forward part of said chamber, a stationary inwardly extending seat for said disk at the forward end of said chamber, a spring in said chamber so mounted and connected thereto as to tend to force said disk to its seat, a coupling stem connected to said disk and carrying a coupling head at its outer end, a spring between said disk and coupling head holding said stem and head normally in extended position with said disk on its seat, the strength of said spring being so proportioned that when said head is moved inward to coupled position, said disk will be moved from its seat and held suspended in said chamber by the action of said springs.

7. In an automatic train pipe coupling, a coupling member comprising a base having a hollow portion or chamber, a disk in the forward part of said chamber having a convex inner surface and a concave outer surface with inwardly directed flanges, a coupling stem carried by said disk and having a limited rearward movement therethrough, a spring surrounding said stem and having its base connected with the disk within the concave portion by said flanges, a coupling head carried by the stem and extended by said spring, and a second spring within said chamber or hollow portion, said second spring having a universal seat or bearing on the convex back of said disk and a rigid seat or bearing at the rear of the base.

8. In an automatic train pipe coupling a base adapted to be connected to a car and composed of two symmetrical parts secured together forming an open end chamber between them with an inwardly extending seat at the forward end of said chamber, a movable disk in said chamber adapted in its forward position to bear against said seat, a spring in said chamber behind said disk tending to force it to its seat, adjustable means entering the other end of said seat to vary the tension of said spring, and a coupling stem carrying a coupling head connected to said disk and yieldingly held in extended position.

9. In an automatic train pipe coupling, a base having therein a chamber with an open end and an inwardly extending seat at said open end, a disk adapted to contact with said seat and having a convex inner surface, the said disk being made of two symmetrical fitting parts and extending out to approximately the inner surface of said chamber, a coupling stem having a reduced portion at one end passing through said disk centrally between the parts thereof, and so connected thereto as to permit slight relative movement, a coupling head carried by said stem, a coiled spring around said stem secured to said disk and bearing against and holding in extended position said coupling head and yielding means in said chamber for forcing said disk to its seat.

10. In an automatic train pipe coupling, a base having therein a chamber with an open end and an inwardly extending seat at said open end, a disk adapted to contact with said seat and having a convex inner surface, the said disk being made of two symmetrical fitting parts and extending out to approximately the inner surface of said chamber, a coupling stem having a reduced portion at one end passing through said disk centrally between the parts thereof and so connected thereto as to permit slight relative movement, a coupling head carried by said stem, a coiled spring around said stem secured to said disk by the cooperative action of its two parts when brought together and bearing against and holding in extended position said coupling head and yielding means in said chamber for forcing said disk to its seat.

11. In an automatic train pipe coupling, a base adapted to be connected to a car composed of two symmetrical parts secured together and forming an open end chamber between them with an inwardly extending seat at the forward end of said chamber, a movable disk in said chamber adapted in its forward position to bear against said seat, the said disk being formed of two symmetrical parts fitting together on a center line, a coupling stem carrying a coupling head at its outer end and a spring surrounding said stem and bearing at its outer end on said coupling head, the meeting edges of the two parts of said disk and the inner ends of said stem and spring being so formed that when said parts of said disk are brought together in operative relation the ends of the stem and spring will be caught and secured in position between them and held against relative movement beyond a slight amount through the connection to the stem, and means in said chamber for yieldingly forcing said disk to its seat.

In testimony whereof I affix my signature in presence of a witness.

JOSEPH V. ROBINSON.

Witness:
JAMES H. WARD.